INVENTOR.
NEIL J. NORMANDO

Aug. 23, 1966  N. J. NORMANDO  3,268,805
SEAM TRACKING AND FLAW DETECTION
Filed Nov. 16, 1962  4 Sheets-Sheet 2
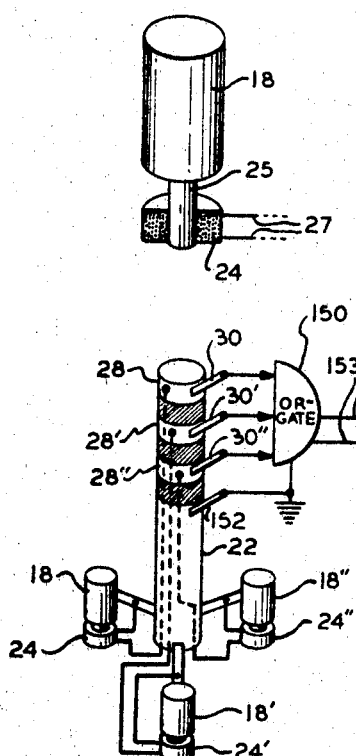
FIG. 2
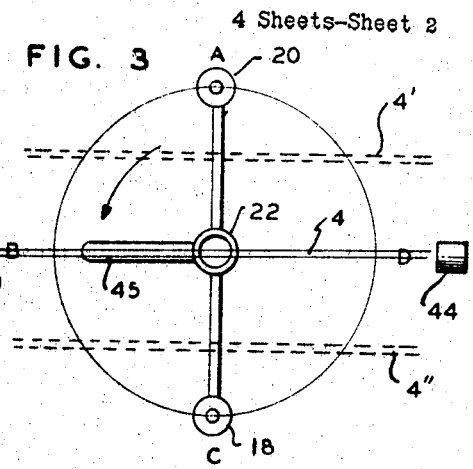
FIG. 3
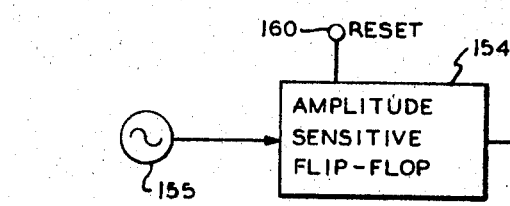
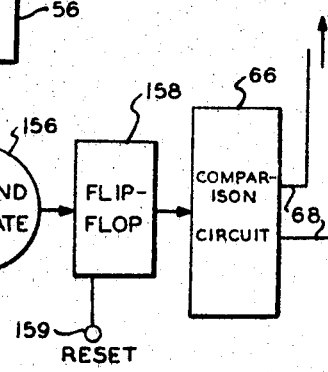
FIG. 5
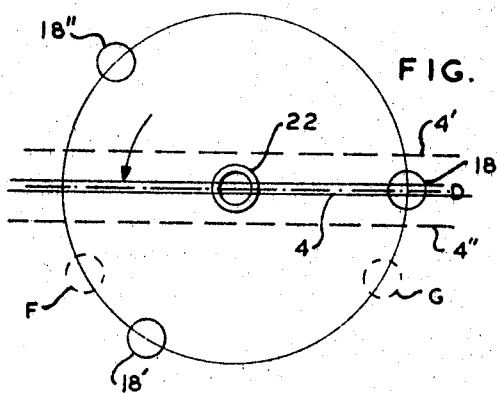
FIG. 6
INVENTOR.
NEIL J. NORMANDO
BY
John W. Gaines
Attorney

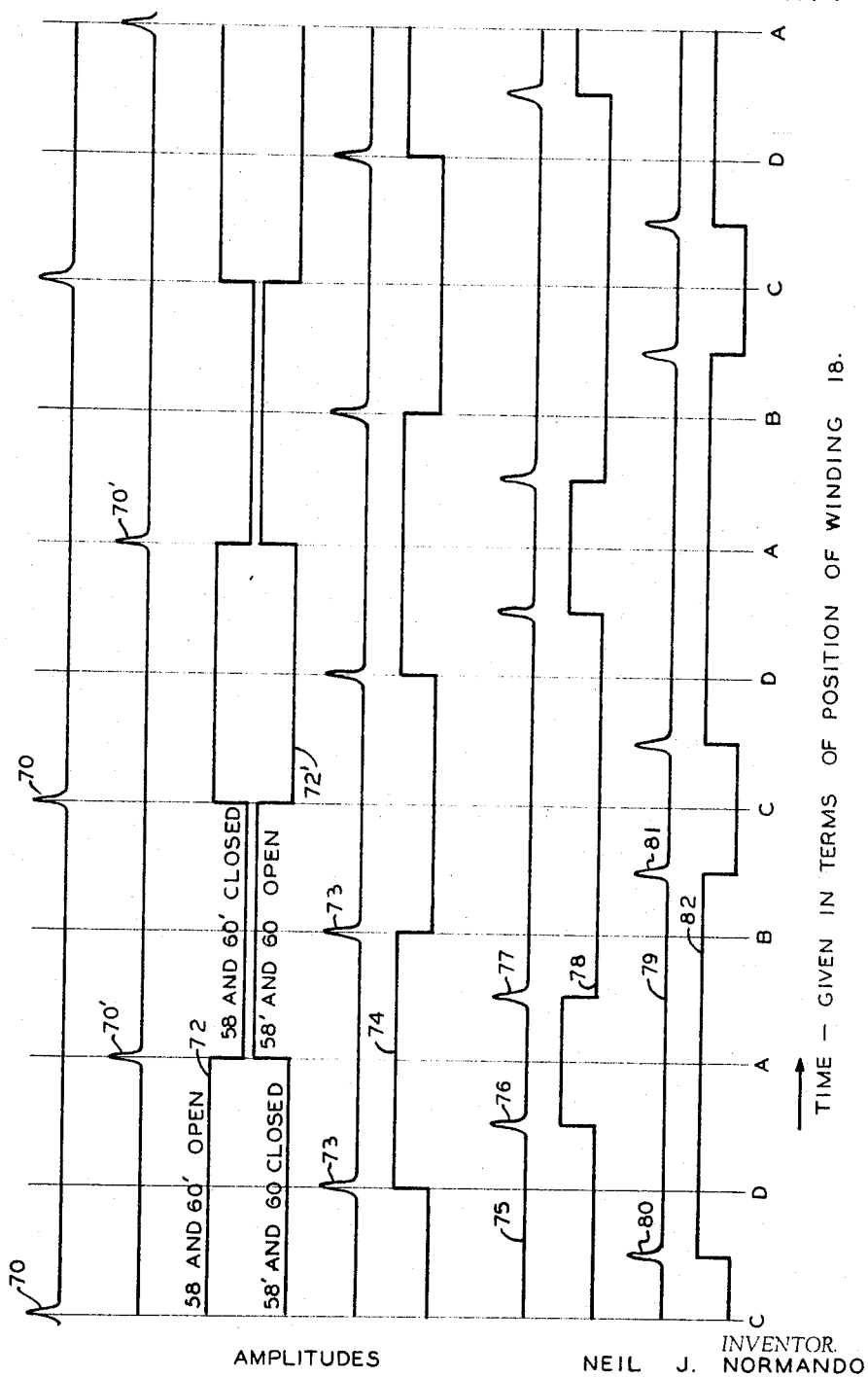

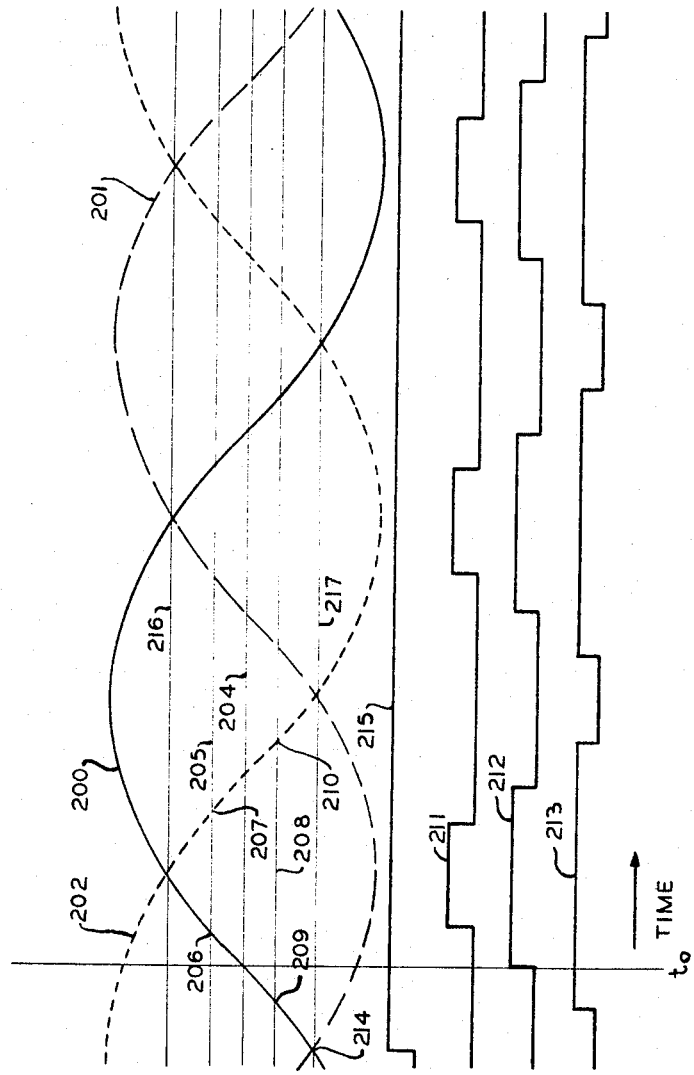

United States Patent Office 3,268,805
Patented August 23, 1966

3,268,805
SEAM TRACKING AND FLAW DETECTION
Neil J. Normando, Livingston, N.J., assignor to Air Reduction Company, Incorporated, New York, N.Y., a corporation of New York
Filed Nov. 16, 1962, Ser. No. 238,187
14 Claims. (Cl. 324—37)

This invention relates to seam tracking and more particularly to the use for this purpose of an electromagnetic sensing element including a permanent magnet.

Tracking apparatus heretofore employed has generally involved the use of complex and expensive sensing devices and in many cases has been subject to errors resulting from variations in the spacing between the sensing element and the workpiece during operation.

An object of this invention is to reduce the number of component parts required in a tracking system and generally to simplify and improve the operation of the system.

Another object is to reduce the power required for excitation of the sensing element by employing a permanent magnet in the pick-up operation.

Another object is to detect flaws or other irregularities in metal objects, particularly in non-ferrous metals.

Another object is to adapt a tracking system for use with either magnetic or non-magnetic conductive materials, either ferrous or non-ferrous.

I employ a permanent magnet, movable in proximity to the workpiece. A sensing winding surrounds the magnet or a polepiece thereof, forming together with the magnet a sensing element. The sensing element is made to vibrate or rotate in a direction generally parallel to the surface of the workpiece and transversely to the seam. The response induced in the sensing winding in passing a discontinuity in the workpiece is proportional to the resultant change of flux density within the winding, and to the relative velocity of the winding and the workpiece. Except in the immediate vicinity of the seam, the flux density and eddy current pattern in the workpiece are constant, as well as the relative velocity, so that the flux density within the winding is invariable with time and no material signal is induced in the sensing winding. However, when the sensing element passes over a flaw or break in the workpiece, such as a seam, the uniform eddy currents flowing in the workpiece are disturbed and the change in the eddy current pattern produces a change in the flux density which in turn generates a pulse in the sensing winding. Thus, a pulse is generated each time the sensing element passes over the seam, thereby sensing the presence of the seam. If the scanning motion of the sensing element is periodic and is centered with respect to the seam, the induced pulses occur at equal time intervals. If the scanning pattern shifts to one side or the other of the seam, the time intervals between successive pulses become unequal. In this way, it is possible to obtain an error signal which reflects the mean position of the sensing element relatively to the seam, and to use the error signal to cause the sensing element to track the seam. In the usual manner, a welding device, such as an electric or gas welding arc or electron beam or other device may be made to follow the seam under the control of the sensing element.

Other features, objects and advantages will appear from the following more detailed description of illustrative embodiments of the invention, which will now be given in conjunction with the accompanying drawings.

In the drawings,

FIG. 2 is an enlarged perspective view, partly broken away, of a sensing element of the type shown generally in FIG. 1;

FIG. 3 is a diagram useful in explaining the operation of the system of FIG. 1;

FIG. 4 is a set of graphs of idealized wave forms and pulse trains at various points in the system of FIG. 1 under certain specified conditions;

FIG. 5 is a combination of a perspective view and a block diagram, showing a modification of certain portions of the arrangement of FIG. 1;

FIG. 6 is a diagram useful in explaining the operation of the modified system shown in FIG. 5; and FIG. 7 is a set of graphs of idealized wave forms and pulse trains useful in explaining the operation of the modified system of FIG. 5.

Figure 1:
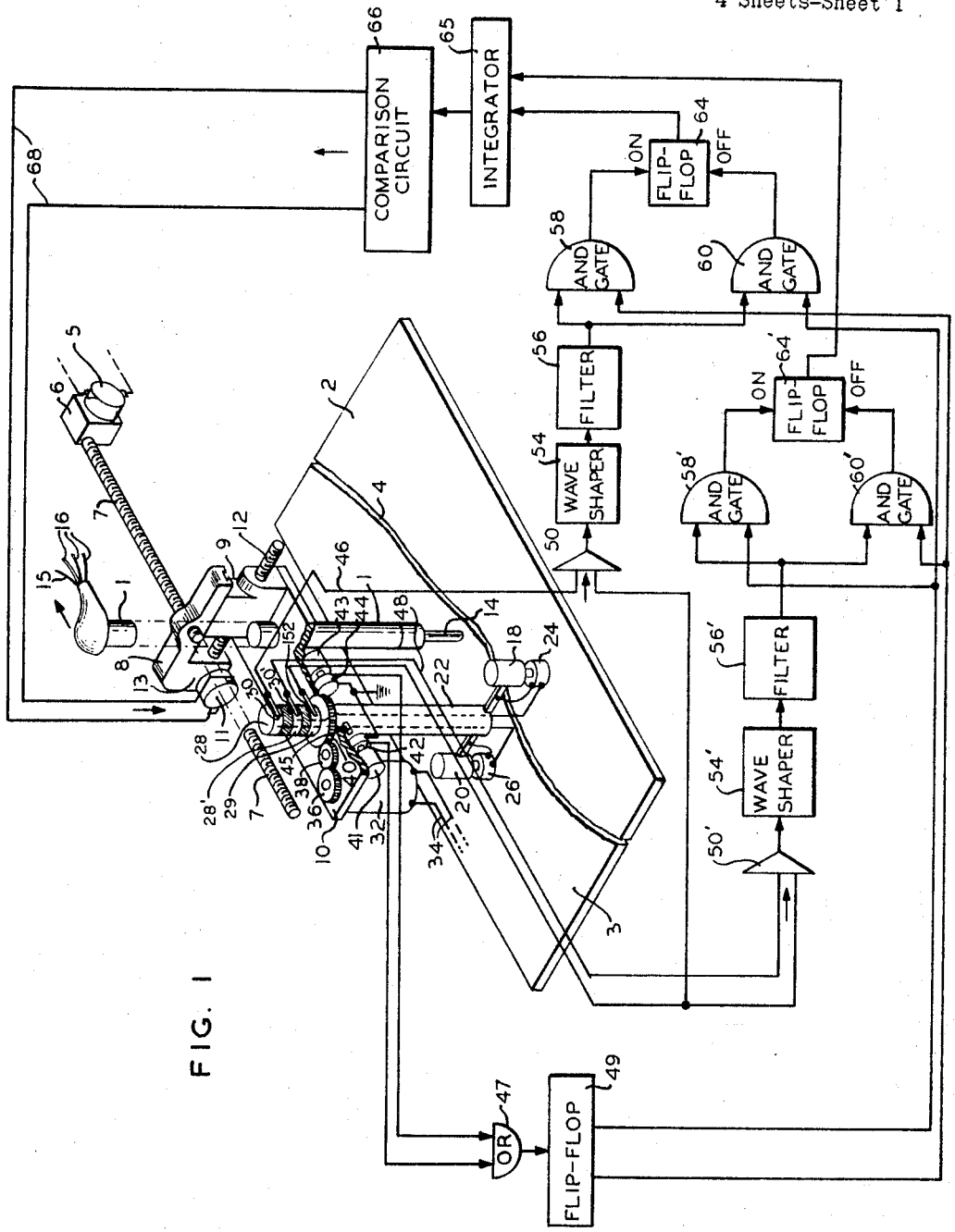
FIG. 1 is a combination of a perspective view, partly broken away, and a block diagram, of an illustrative embodiment of the invention.

As shown in FIG. 1, a tool, illustrated as a welding torch 1, shown partly broken away, is mounted to traverse a workpiece comprising workparts 2 and 3 meeting at a seam 4, by means of a motor 5 connected through gearing in a casing 6 to a lead screw 7 which extends generally in the direction of the seam 4. This lead screw 7 imparts motion to a carrier 8 which acts as a support for a slide 9 on which the welding torch 1 is mounted as on an attached plate or bracket 10. The slide 9 is movable crosswise of the seam 4 relative to its carrier 8 by a reversible motor 11 which imparts rotation to a cross-adjusting screw 12 with which it is connected through gearing in a casing 13 which may be integral with the carrier 8 or attached thereto. The cross-adjusting screw 12 makes a threaded engagement with the slide 9. The arrangement is such that rotation of motor 11 in either direction will adjust slide 9 relatively to its carrier 8 to position the welding torch 1 laterally of the seam 4 as it is traversed lengthwise thereof by the motor 5 acting through its gear transmission in casing 6 and lead screw 7 which engages the carrier 8. The motor 5 is connected, as indicated, to a source of supply by means of which its speed and direction of rotation are controlled to traverse the welding torch 1 in the general direction of the seam 4. It is of course understood that the parts of the machine just described are suitably supported relatively to one another and to the workpiece by other members of the machine which for clarity of illustration have not been shown. Also the workparts 2 and 3 may be held in assembled relationship in a clamp or clamps forming part of the machine or forming part of a jig which may be positioned in the machine, or the machine may be positioned on or over the workparts which are otherwise assembled as by tack welding at spaced positions along the seam.

Any suitable welding agency may be employed and I have illustrated an inert gas shielded electric arc welding torch which may have the construction illustrated and described in United States Letters Patent 2,512,705, Nelson E. Anderson and George R. Turbett, granted June 27, 1950, and entitled, Fluid-Cooled Gas-Blanketed Arc Welding Torch. Welding current is supplied to the electrode 14 of this torch through a welding cable 15, and cooling fluid and inert shielding gas may be supplied thereto through hoses 16.

As a sensing element to sense the presence of the seam 4, I employ a combination as shown in FIG. 2, of a permanent magnet 18, a pole piece 25 of highly permeable magnetic material such as soft iron, and a winding 24 comprising many turns of suitably fine wire close to the tip of the pole piece 25. The pole piece 25 is preferably made of small diameter relatively to the permanent magnet so as to concentrate the main body of magnetic flux of the magnet over a small area at the exposed tip of the pole piece. The sensing element is preferably mounted with the exposed tip of the pole piece 25 in close proximity to the workpiece as represented in FIG. 1. The ends of the winding 24 are represented at 27 in FIG. 2.

For considerations of mechanical balance, at least one additional sensing element is preferably used, as shown in FIG. 1, comprising magnet 20 and winding 26, the two sensing elements being preferably mounted diametrically opposite each other with respect to a supporting device such as a tube 22, rotatably mounted upon the plate 10. One end of each of the windings 24, 26, may be grounded to the tube 22. The remaining two winding ends and the ground connection may be brought out, as shown in FIG. 5, by means of slip rings 28, 28' and 29 to brushes 30, 30' and 152, respectively.

The sensing magnet 18 may be used alone without the second magnet 20. In this case, the slip ring 28', brush 30', amplifier 50', wave shaper 54', filter 56', and-gates 58', 60', and flip-flop 64' are not needed. For mechanical balance it may then be advisable to employ a dummy unit in place of magnet 20 and winding 26.

The tube 22 is made rotatable in suitable bearings (not shown) and is rotatively driven by a constant speed or synchronous motor 32 which is in turn supplied with power from any suitable source, represented in the drawing by power supply leads 34. A train of gear wheels 36, 38, 40 is shown for transmitting rotary motion from the motor 32 to the tube 22. To act as resolvers for identifying successive pulses, magnets 41 and 43 with windings 42 and 44, respectively, are mounted on the plate 10 in position to lie directly above the seam when the tube 22 is centered with respect to the seam, and respectively ahead and behind the tube 22 as shown. A stud 45 of ferrous material is mounted upon the tube 22 in an angular position 90 degrees behind the magnet 18 in the direction of rotation of the tube 22.

A lead 46 connects the brush 30 to the input side of an amplifier 50 and a lead 48 connects the brush 30' to the input side of an amplifier 50'. The course of the outputs of the amplifiers 50 and 50' is shown in single line schematic form in FIG. 1. The outputs of the amplifiers may be reshaped and noise may be reduced in the pulse trains by passing the amplifier outputs through the respective wave shapers 54, 54' and the filters 56, 56'. The resultant pulse train from the amplifier 50 is impressed in parallel upon the inputs of and-gates 58 and 60, while the resultant pulse train from the amplifier 50' is impressed in parallel upon the inputs of other and-gates 58' and 60'.

The windings 42 and 44 are connected through an or-gate 47 to a bistable flip-flop 49. Output of one polarity from the flip-flop 49 is impressed upon the inputs of the and-gates 58 and 60', while output of opposite polarity is impressed upon the inputs of the and-gates 58' and 60. The output of the and-gate 58 is connected to the on-turning input terminal of a bistable flip-flop 64. The output of the and-gate 60 is connected to the off-turning terminal of the flip-flop 64. Similarly, the output of the and-gate 58' is connected to the on-turning terminal of a bistable flip-flop 64', and the output of the and-gate 60' is connected to the off-turning terminal of the flip-flop 64'. The outputs of the flip-flops 64 and 64' are combined in an integrator 65 which is in turn connected to the input of a comparison circuit 66. A pair of leads 68 is shown connecting the output of the comparison circuit 66 to the input of the motor 11.

The operation of the arrangement shown in FIG. 1 will now be described by reference to the diagrams shown in FIGS. 3 and 4. FIG. 3 represents a reference state wherein the axis of rotation of the tube 22 is directly over the seam 4 and the magnet 18 is at its furthest distance below the seam as viewed in the figure. For reference purposes, the quadrantal points of the circular path of the magnet 18 are designated A, B, C and D, it being assumed that the rotation is in the counterclockwise direction as viewed in FIG. 3 and that the magnet 18 is at position C at the time represented by the diagram. At this time, magnet 20 is at position A.

FIG. 4 is a set of graphs all having the same time axis, which latter is marked off in terms of the successive positions A, B, C and D of magnet 18. The stud 45 in passing the magnet 41 generates a pulse each time the magnet 18 is in position C, as shown in graph 70. In passing the magnet 43, the stud 45 generates a pulse each time the magnet 18 is in position A, as shown in graph 70'. The pulses represented in graph 70 are assumed to put flip-flop 49 into the state in which the output of the flip-flop impresses a positive potential upon and-gates 58 and 60' and a negative potential upon and-gates 58' and 60, thereby opening and-gates 58 and 60' as shown in graph 72 and closing and-gates 58' and 60 as shown in graph 72'. The pulses represented in graph 70' then change flip-flop 49 into the state in which the output of the flip-flop impresses a negative potential upon and-gates 58 and 60' and a positive potential upon and-gates 58' and 60, thereby closing and-gates 58 and 60' as shown in graph 72 and opening and-gates 58' and 60 as shown in graph 72'.

As long as the tube 22 is centered over the seam 4 the magnet 18 crosses the seam at regular intervals, that is, at positions B and D as shown in FIG. 3. Each time the magnet 18 crosses the seam 4, a pulse is generated in the winding 24. For the case in which the tube 22 remains centered over the seam 4, the pulses generated in the winding 24, occurring at the time positions B and D, are shown in graph 73. It will be assumed that the pulses comprising graph 73 are all essentially positive. If a pulse of graph 73 occurs during the time that the flip-flop 49 is impressing a positive potential upon the gate 58, the flip-flop 64 receives a pulse through the gate 58 which is applied to its on-turning terminal, thereby starting a square wave pulse as shown in graph 74 at time position D. At this time, gate 60 is not conditioned and so does not pass a pulse. The next succeeding pulse of graph 73 occurs at time position B when the flip-flop 49 is maintaining a positive potential on gate 60 and a negative potential on gate 58. The result is that flip-flop 64 now receives a pulse at its off-turning terminal, and none at its on-turning terminal, thereby ending a square wave pulse at time position B as shown in graph 74. This pulse is used as a time interval measuring pulse as will be described below.

In the case when the tube 22 is not centered over the seam 4, and the magnet 18 as viewed in FIG. 3 spends more time below the seam 4 than above, as when the seam is at 4', the magnet makes one crossing of the seam somewhere between time position D and time position A, and another crossing somewhere between time position A and time position B. The pulses generated by the winding 24 are now placed timewise as shown by way of a representative example in graph 75, wherein the pulses occur midway between D and A and midway between A and B. The pulse marked 76 in the graph occurs within the positive period of graph 72 as before and the pulse marked 77 occurs within the positive period of graph 72'. The result is a shortened time measuring pulse from flip-flop 64 as shown in graph 78.

In the case when the magnet 18 as viewed in FIG. 3 spends more time above the seam 4 than below, as when the seam is at 4", the magnet 18 makes crossings of the seam between C and D and also between B and C, as shown in graph 79. Again, the pulse marked 80 occurs while the gate 58 is open as shown by graph 72 and the pulse marked 81 occurs while the gate 60 is open as shown in graph 72', thereby preserving the correct time order of the pulses. The result is a lengthened time measuring pulse from the flip-flop 64 as indicated by graph 82.

The events detailed above for the magnet 18 are repeated by the action of the magnet 20 one half revolution behind the corresponding events for magnet 18 and may be represented by similar graphs (not shown), taking into account that the positions of the and-gates remain as shown in graphs 72 and 72'. It will be noted that when magnet 18 determines a shortened time measuring pulse centered about position A as shown in graph 78, the magnet 20 likewise determines a shortened time measuring pulse, but centered about position C. The time measuring pulses from the flip-flops 64 and 64' always occur alternately and so may be added together to increase the sensitivity of the control signal.

The pulses from the flip-flops 64 and 64' are preferably averaged or integrated in the integrator 65 in order that the circuit 66 may receive a substantially direct current which varies in amplitude from time to time as the seam and magnets depart from a symmetrical relationship. In the comparison circuit 66, the varying direct current may be compared with a standard constant voltage in known manner to obtain an error signal which is zero when the tube 22 is centered over the seam and which indicates by its polarity which side of the seam the tube 22 is on when the tube 22 is off center. The current furnished over the leads 68 to the motor 11 then determines the direction of rotation as well as the speed of the motor 11 so that the motor 11 turns the screw 12 in the proper direction to restore the tube 22 to the centered relationship with the seam 4, thereby enabling the tool 14 to track the seam 4.

The invention may be practiced even under conditions in which there is considerable noise picked up by the sensing windings as long as the signal pulse is sufficiently strong to be distinguishable from the noise. In such cases the amplified output from the amplifier 50 may be reshaped in known manner in the wave shaper 54 and passed through the narrow band pass filter 56 tuned to the pulse repetition frequency. These and various other expedients known in the art may be employed for improving the ratio of signal to noise.

FIG. 5 shows a three-unit sensing system and accompanying circuitry. The tube 22 supports three magnets 18, 18', 18'', preferably spaced at equal angles on a circle concentric with the axis of the tube 22. Individual sense windings 24, 24', 24'', are provided, coupled to the respective pole pieces to form a three-phase system. One end of each sense winding may be connected to a conductive portion of the tube 22 while the other winding ends may be brought out to slip rings 28, 28', 28'', respectively, which are insulated from each other and the rest of the tube 22. Brushes 30, 30', 30'' are provided for connecting the respective slip rings to the input terminals of an or-gate 150. A neutral or ground connection from the tube 22 to the or-gate 150 may be made by way of a brush 152 contacting the tube 22, or by way of the bearings and supports of the tube 22. Leads 153 connect the output of the or-gate 150 to the input of the amplifier 50. A phase reference generator 155 is connected to the input of a one-shot, amplitude-sensitive flip-flop 154. The output of the flip-flop 154 is connected to an and-gate 156 along with the output from the amplifier 50, the latter preferably by way of the wave shaper 54 and filter 56. The output from the gate 156 is connected through a flip-flop 158 to the comparison circuit 66 and thence to the leads 68 which go to the motor 11 as in FIG. 1. The generator 155 is preferably arranged to generate a sinusoidal wave the frequency of which is the same as the frequency of rotation of the tube 22.

In the operation of the arrangement shown in FIG. 5, upon start-up, the flip-flop 154 is arranged to be in the off condition, in which condition it applies to the and-gate 156 an inhibiting potential which may be designated as a negative potential. The phase relationship between the generator 155 and one of the sensing windings, say winding 24, is made such that when the tube 22 is centered upon the seam 4, as shown in FIG. 6, and the magnet 18 is crossing the seam, the reference wave is crossing zero. The amplitude bias of the flip-flop 154 is set at such a value that when the magnet 18 has rotated 30 degrees beyond the on-seam position to a position shown at F the phase reference wave applies a pulse of known polarity to the flip-flop 154 and also when the magnet 18 has rotated to the position shown at G, 30 degrees before the next on-seam position, the phase reference wave applies a pulse of the reverse polarity to the flip-flop 154. A pulse of one of the latter two polarities is able to cause the flip-flop 154 to go over to the on condition, for example, the pulse at position G but not the pulse at position F. Thus, at start-up, the gate 154 will remain closed until the magnet 18 first arrives at the predetermined angular position, which will be position G. The gate 154 then opens and remains open thereafter until the machine is shut down, at which time it may be reset to the closed condition in known manner by a pulse applied to reset terminal 160.

Following the opening of the gate 156, pulses are applied in succession to the flip-flop 158 through the gate 156. As viewed in FIG. 6, magnet 18 shortly after passing position G produces a pulse as it crosses the seam in the upward direction in the figure. Then magnet 18'' produces a pulse as it crosses the seam in the downward direction, followed by magnet 18' crossing upward, magnet 18 downward, magnet 18'' upward, magnet 18' downward, magnet 18 upward, etc. The flip-flop 158 is of the type that is actuated from a single input terminal by successive pulses, which pulses cause the flip-flop to turn on and off alternately. As long as the tube 22 is centered upon the seam, the on and off periods of the flip-flop 158 are of equal duration. Within the useful range of the system, departure of the tube 22 from centered position on one side results in shortening of the on periods and lengthening of the off periods. Departure of the tube 22 from centered position on the other side results in lengthening of the on periods and shortening of the off periods. The variations in length of the on periods is used to actuate the motor 11 in a manner similar to that described above in connection with FIG. 1 to track the seam.

The operation of the system of FIG. 5 will now be further explained with reference to FIG. 7. The solid sinusoidal curve 200 represents the reference carrier wave. At the time $t_0$, the reference wave is passing through zero value, at which time, as shown in FIG. 6, magnet 18 at position D is crossing the seam in the upward direction of the figure. The dash line sinusoidal curve 201 represents the time variation of the position of the magnet 18', crossing the seam in the upward direction 120 degrees later in the cycle as compared to the magnet 18. Similarly, the dotted curve 202 represents the time variation of the position of the magnet 18''. When the tube 22 and seam 4 are in the centered relationship, the position of the seam is represented by the horizontal line 204 and the successive seam crossings by the magnets are uniformly spaced in time. If, however, the seam is above the axis of the tube 22 as viewed at 4' in FIG. 6, the seam is no longer represented in FIG. 7 by line 204 but by a line such as 205 above the line 204. In this case, two successive seam crossings occur relatively close together, as at 206 and 207, followed by a longer space. If on the other hand, the seam is below the axis of the tube 22 as at 4'' in FIG. 6, the seam is represented by line 208 in FIG. 7 and the two successive seam crossings shown at 209 and 210 are relatively far apart, followed by a shorter space. The resulting pulse trains at the output of the flip-flop 158 are shown at 211 for the shortened pulses, at 212 for the pulses of uniform on and off period, and at 213 for the lengthened pulses. To insure that the first input pulse to reach the flip-flop 158 on start-up will be a pulse generated by magnet 18 on an upward crossing of the seam as viewed in FIG. 6, the flip-flop 158 is set to the off condition at the outset and is reset to that condition at the end of operation by means of an appropriate reset pulse applied in conventional manner to a reset terminal 159 connected to flip-flop 158, and as described above, the flip-flop 154 opens the gate 156 when the curve 200 is at the point 214 which is 30 degrees before the magnet 18 normally crosses the seam, in the upward direction as viewed in FIG. 6. The state of the gate 156 as a function of the time is shown in line 215. It will be evident from the figure that the first seam crossing to occur after gate 156 opens will be a crossing by magnet 18, whether this crossing occurs at point 209, point 206, or anywhere else within the useful range of the control system. In FIG. 7, the useful range lies between the horizontal lines 216 and 217, which pass through points where the sinusoidal curves cross one another.

The invention may be practiced upon conductive materials, magnetic or non-magnetic, ferrous or non-ferrous.

Inasmuch as the system responds primarily to differences in time intervals between successive pulses, it is relatively insensitive to amplitude variations and consequently to changes in clearance between the workpiece and the magnet. Thus it may be used where the surface of the workpiece is undulating or otherwise irregular, and also where the clearance is different on the two sides of the seam, as in joining together plates of unequal thickness.

The system is relatively insensitive to external materials such as adjacent parts of the machine since the field through the pole piece is principally due to the material directly adjacent to the pole piece and is little influenced by materials farther away.

Since the permanent magnet provides the excitation for the pick-up element, no power need be supplied for this excitation.

The number of sensing elements may be increased as desired, by positioning more magnets, preferably uniformly spaced around the circumference of a circle centered upon the axis of the tube 22. In each case, within the useful operating range, equal crossing intervals indicate a centered condition and unequal crossing intervals indicate a lack of centering.

In addition to seam tracking, the system disclosed is useful for detecting flaws or cracks in articles or other objects which are composed of ferrous or non-ferrous metals.

While illustrative forms of apparatus and methods in accordance with the invention have been described and shown herein, it will be understood that numerous changes may be made without departing from the general principles and scope of the invention.

What is claimed is:

1. In a seam tracking device, in combination, seam sensing means, scanning means operative to cause said seam sensing means to pass periodically over the seam to be tracked alternately in opposite directions relatively to the seam, whereby said seam sensing means generates a pulse at each passage over the seam, means to distinguish a pulse generated during a passage of the sensing means over the seam in one direction from a pulse generated during a passage of the sensing means over the seam in the other direction, means controlled by pulses generated during passages of the sensing means over the seam solely in one given direction to initiate time measuring pulses, means controlled by pulses generated during passages of the sensing means over the seam solely in the other direction to terminate said time measuring pulses, and means responsive to the length of the said measuring pulses to move said seam sensing means in a direction transverse to the seam.

2. In a seam tracking device, in combination, seam sensing means, scanning means operative to cause said seam sensing means to pass periodically over the seam to be tracked alternately in opposite directions relatively to the seam, whereby said seam sensing means generates a pulse at each passage over the seam, means actuated by said scanning means to develop a reference signal, a pair of gate circuits, means actuated by said reference signal to operate said gate circuits alternately during the respective intervals during which the sensing means passes over the seam in the two opposite directions, means to feed the said pulses to said gate circuits, whereby pulses generated during passage over the seam in one direction pass through one gate circuit and pulses generated during passage over the seam in the reverse direction pass through the other gate circuit, means operated by pulses passed through one said gate to start a time measuring pulse, means operated by pulses passed through the other said gate to end a said time measuring pulse, and means responsive to the length of the said measuring pulse to move said sensing means in a direction transverse to the seam.

3. In a seam tracking system, apparatus comprising, in combination, a permanent magnet, a winding coupled thereto and forming in conjunction therewith a sensing device for detecting variations in magnetic flux, supporting means for said sensing device, means for moving said supporting means in the general direction along a seam to be tracked in an electrically conductive material, independent means for moving said supporting means transversely of said seam, scanning means for moving said sensing means relatively to said supporting means and transversely to said seam in a substantially uniform periodic motion about the seam, whereby a signal pulse is generated each time the sensing device passes over the seam, means to detect variations in the time interval between successive pulses so generated, whereby an error signal is developed, means actuated by said error signal to control the motion of said supporting means transversely of the seam, thereby to substantially center the periodic motion of said sensing device with respect to the seam as indicated by substantially uniform time intervals between successive pulses generated by said sensing device.

4. Apparatus according to claim 3, in which the said conductive material is a magnetic material.

5. Apparatus according to claim 3, in which the said conductive material is substantially non-magnetic.

6. Apparatus according to claim 3, in which the said conductive material is a ferrous material.

7. Apparatus according to claim 3, in which the said conductive material is a non-ferrous material.

8. In a seam tracking system, in combination, a permanent magnet, a winding coupled thereto and forming in conjunction therewith a device for sensing varying magnetic flux, supporting means for said sensing device, means for moving said supporting means independently in the general direction along a seam to be tracked in an electrically conductive material and in the direction transverse to said seam, means to rotate said sensing device about an axis fixed relatively to said supporting means and perpendicular to a conductive workpiece containing a seam to be tracked, whereby the sensing device may be made to pass over the seam repeatedly, and whereby a signal pulse is generated each time the sensing device passes over the seam, means to detect variations in the time interval between successive pulses so generated, whereby an error signal is developed, means actuated by said error signal to control the motion of said supporting means transversely of the seam to move the said axis of rotation of said sensing device, whereby the rotation of said sensing device may be substantially centered with respect to the seam, as indicated by substantially uniform time intervals between successive pulses generated by said sensing device.

9. Apparatus according to claim 8, in which the said means to rotate the sensing device operates at a substantially constant angular rate.

10. In a seam tracking device, in combination, supporting means movable in the general direction along a seam to be tracked in an electrically conductive material and independently movable in the direction generally transverse to the seam, a rotatable member mounted upon said supporting means arranged for rotation at substantially constant speed about an axis perpendicular to the surface of a workpiece and in proximity to the seam to be tracked, a plurality of permanent magnets mounted upon said rotatable member in proximity to the surface of the workpiece, individual sensing windings coupled to the respective magnets, said magnets being spaced at substantially equal distances from the axis of rotation and spaced apart from each other at substantially equal angles about the axis, whereby the said magnets pass successively and repeatedly over the seam and generate in the respective sensing windings a signal pulse at each passage of a magnet over the seam, means to detect variations in the time interval between successive pulses so generated, whereby an error signal is developed, means actuated by said error signal to control the motion of said supporting means transversely of the seam to move the axis of rotation relatively to the seam, whereby the axis of rotation may be maintained substantially centered with respect to the seam, as indicated by substantially uniform time intervals between successive pulses generated in said sensing windings.

11. In a seam tracking device, in combination, a plurality of seam sensing units, scanning means operative to cause said sensing units to follow one another around a circular path intersecting the seam to be tracked, said sensing units being spaced at substantially equal distances from the center of rotation and spaced apart from one another at substantially equal angles about the center of rotation, means individual to one of said sensing units to distinguish the direction of crossing of the said sensing unit relatively to the seam, means to start time measuring pulses at the time of occurrence of alternate seam crossings and to end each such time measuring pulse at the time of occurrence of the next succeeding seam crossing following the start of said pulse, means to detect variations in the length of successive time measuring pulses, whereby an error signal is developed, means actuated by said error signal to control the motion of said sensing units to move the center of rotation relatively to the seam, whereby the center of rotation may be maintained substantially centered with respect to the seam, as indicated by substantial uniformity of length of said successive time measuring pulses, and gating means responsive to the direction of crossing of the seam by said one sensing unit to insure that the first said time measuring pulse starts when said one sensing unit is crossing the seam in a predetermined direction only.

12. The method of seam tracking comprising the steps of passing a sensing means periodically over the seam to be tracked alternately in opposite directions relatively to the seam, detecting a pulse in said sensing means at each passage over the seam, distinguishing a pulse generated during a passage of the sensing means over the seam in one direction from a pulse generated during a passage of the sensing means over the seam in the other direction, starting a time measuring means in response to a pulse generated during a passage of the sensing means over the seam in one direction, and stopping said time measuring means in response to a pulse generated during the next succeeding passage of the sensing means over the seam in the other direction, and utilizing said time measuring means to track the seam.

13. The method of seam tracking comprising the steps of passing a succession of sensing means periodically over the seam to be tracked, alternate ones of said sensing means passing over the seam in opposite directions, detecting a pulse in each said sensing means at each passage of the respective sensing means over the seam, distinguishing in the case of at least one said sensing means between pulses generated by seam crossings in the two directions, detecting variations in the time intervals between pairs of seam crossings in each of which pairs the seam crossings occur in the same order of the two directions, and utilizing said time interval variations to track the seam.

14. In a device for detecting flaws, cracks or other discontinuities in electrically conductive materials, in combination, a permanent magnet having a pole piece with a cross sectional area small compared to the cross sectional area of said magnet, means to produce a periodic scanning motion of said magnet relative to said material, whereby eddy currents are generated in a moving region within said material due to the said scanning motion, and sensing means comprising a sensing winding surrounding said pole piece, movable in fixed relationship to said magnet for sensing a change in magnetic flux density due to a change in the pattern of said eddy currents within said moving region, whereby said sensing means responds when a flaw, crack or other discontinuity in the material is traversed by said moving region.

References Cited by the Examiner

UNITED STATES PATENTS

| | | | |
|---|---|---|---|
| 2,130,882 | 9/1938 | Frobose | 324—37 |
| 2,351,944 | 6/1944 | Engler | 324—37 |
| 2,970,256 | 1/1961 | Sazynski et al. | 324—37 |

WALTER L. CARLSON, *Primary Examiner.*

RICHARD B. WILKINSON, *Examiner.*

R. J. CORCORAN, *Assistant Examiner.*